Dec. 26, 1967     A. L. CHILSTROM     3,360,054

FRONT MOUNTED BEDDER (SWINGABLE FRONT FRAMES)

Filed Feb. 16, 1965     2 Sheets-Sheet 1

Dec. 26, 1967          A. L. CHILSTROM          3,360,054
FRONT MOUNTED BEDDER (SWINGABLE FRONT FRAMES)
Filed Feb. 16, 1965          2 Sheets-Sheet 2

United States Patent Office 3,360,054
Patented Dec. 26, 1967

3,360,054
FRONT MOUNTED BEDDER (SWINGABLE FRONT FRAMES)
Allan L. Chilstrom, West Allis, Wis., assignor to Allis-Chalmers Manufacturing Company, Milwaukee, Wis.
Filed Feb. 16, 1965, Ser. No. 433,150
1 Claim. (Cl. 172—274)

ABSTRACT OF THE DISCLOSURE

This invention is concerned with a two purpose gauge wheel which can be used as a gauge wheel for a pivotally mounted ground working tool and wherein the gauge wheel can be reattached to the main frame for supporting same during movement of the frame when attaching and detaching the frame relative to a tractor.

The present invention relates generally to agricultural implements and more particularly to ground working implements, such as bedders, listers, middle breakers or the like, that are adapted to be attached to and readily detached from a supporting tractor.

The general nature of this invention is the provision of new and improved means for mounting implements directly on farm tractors and without entailing heavy lifting by the operator. It is a feature of this invention to provide articulated frame means carrying ground working implements and improved gauge wheels for such implements wherein such gauge wheels may be repositioned to support the frame of such implements when such implement is being attached to or being removed from a tractor.

Accordingly, it is the principal object of this invention to provide a tractor mounted implement with gauge wheels which provide a double function i.e., such wheels function as gauge wheels during normal operation and which can be removed and repositioned as support wheels when attaching or detaching the implement relative to the tractor.

These and other objects and advantages of the present invention will be apparent to those skilled in the art after a consideration of the following detailed description, taken in conjunction with the accompanying drawings, in which.

Figure 2:
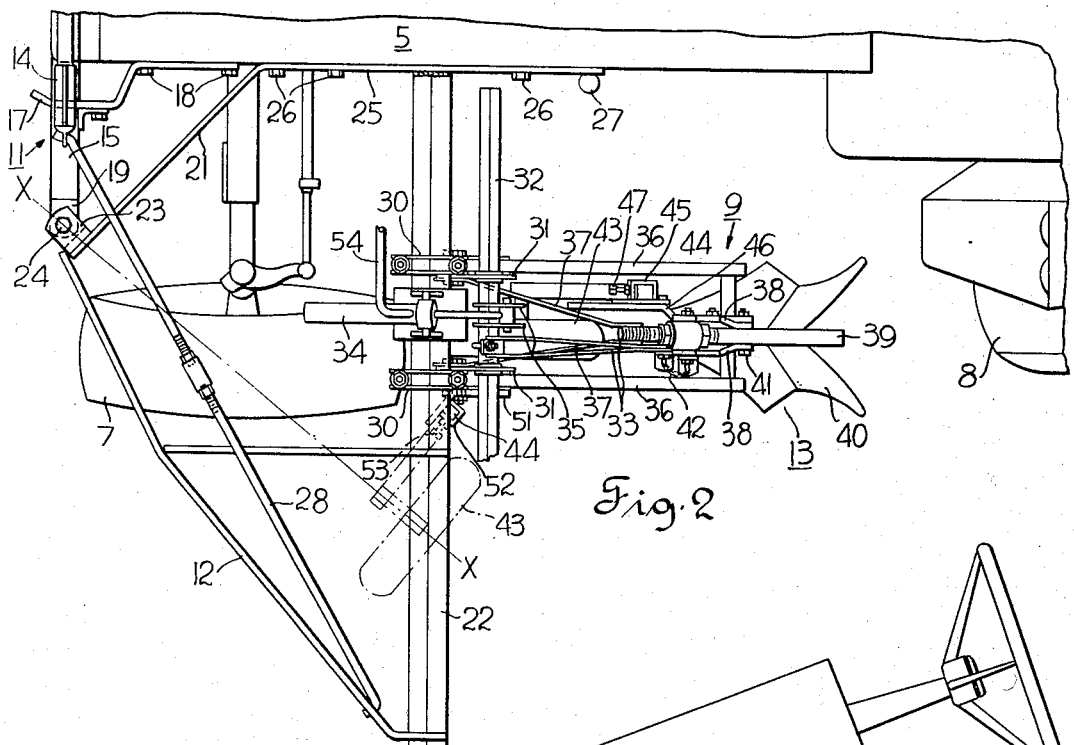
FIG. 2 is a partial plan view of the combination shown in FIG. 1 but with the gauge wheel repositioned for expediting removal of the implement from the tractor.
Figure 1:
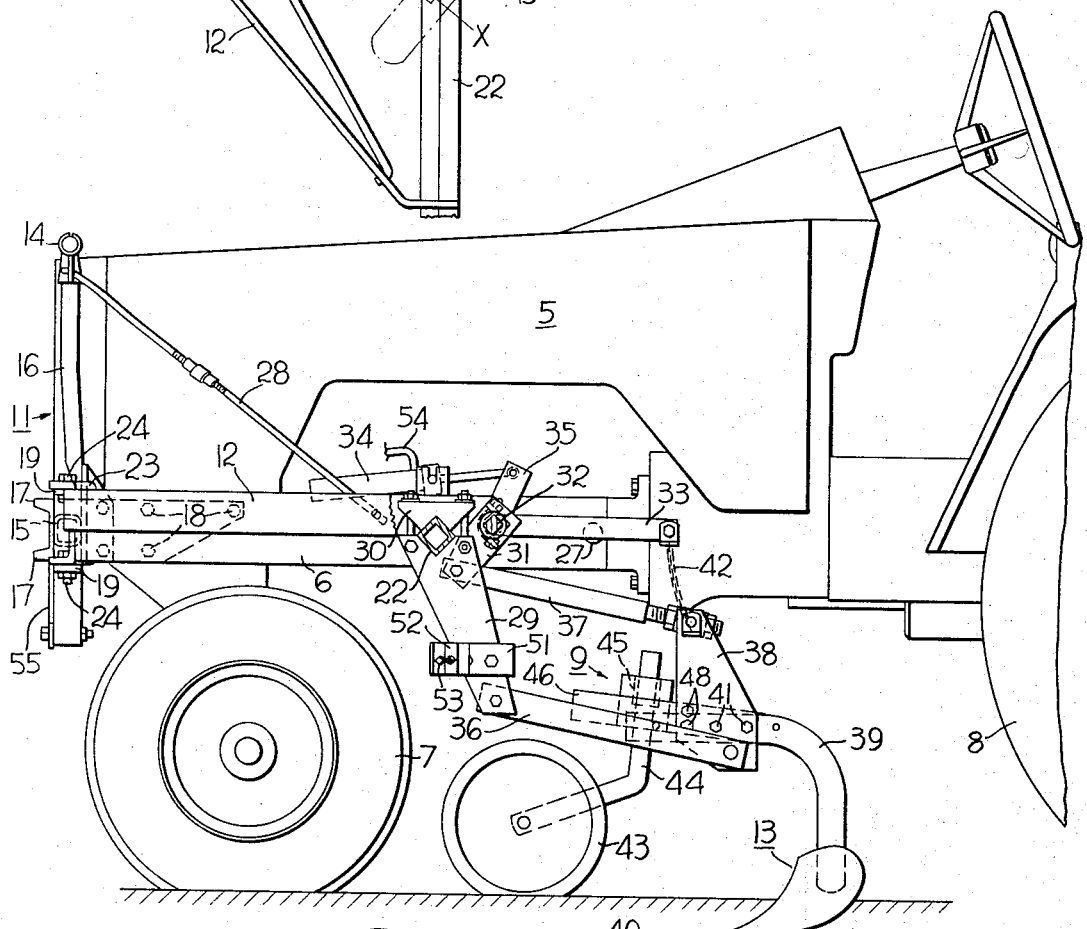
FIG. 1 is a side elevation of an implement and tractor combination embodying the invention, the various parts being shown in their normal ground working position.

Referring now to FIG. 1, the tractor is indicated in its entirety by the reference numeral 5 and is of conventional construction including a generally longitudinally extending frame 6, steerable front wheels 7 and rear drive wheels 8. The tractor also includes hydraulic power means (not shown) adapted to be connected to the implement 9 as will be discussed at a later point in this description. Implement 9 is shown as being a bedder and includes a center frame section 11 (see FIG. 2), left and right hand side frame sections 12, with only the left hand frame section being shown, and bedder units, five in all, generally indicated by reference numeral 13. Only one of the bedder units 13 is shown as the remaining four units are duplicates thereof. The center section 11 of the bedder frame is provided with upper and lower sections 14 and 15, respectively, to which left and right hand vertically extending frame members 16 (see FIG. 1) are connected.

Center section 11 is releasably supported on the front of tractor 5 by means of a pair of transversely spaced forwardly directed forked yokes 17 which receive lower center frame tube 15. Yokes 17 are fixed to the forward portion of tractor 5 by means of bolts 18. Mounted on each side of the lower center frame section 15 are pivot brackets 19 to which are mounted the side frame section 12.

Referring now to left hand side frame section 12, the right hand section has substantially the same structure, said left hand section includes a forward mounting frame structure 21 (see FIG. 2) and a rear transverse square tool bar 22. The forward frame 21 rigidly mounts a bracket 23 which is pivotally connected to the lower frame section 15 by means of bolts 24. The inner portion 25 of the side frame section 12 is adapted to be secured to the tractor frame by means of bolts 26 and guide pin 27. A trust rod 28 connected between the upper portion of the center frame section 11 and the outer end of side frame section 12 further supports the frame as is common in structures of this type.

Each bedder unit 13 is made up of a pair of laterally spaced depending bracket assemblies 29 which are adjustably clamped to the tool bar 22 by means of conventional clamping means 30. Mounted on one of the brackets 29 is a rock shaft supporting bracket 31. Brackets 31 associated with each of the bedder units is provided with suitable bearing means in which a rock shaft 32 is pivotably supported. Lift arms 33 are fixed to rock shaft 32 and positioned above each bedder unit 13. A hydraulic ram 34 is mounted on the tool bar 22 and actuates rock shaft 32 by a pivotal connection to arms 35 rigidly associated with the rock shaft. Hydraulic ram 34 is operatively connected to the hydraulic system of the tractor by conventional means (not shown).

A pair of generally parallel link members 36 and 37 are pivotally connected at their forward ends to bracket 29 and are pivotally connected to vertically disposed transversely spaced plates 38 at their rear ends. A formed bedder beam 39 rigidly carries a bedder bottom 40 on the lower end thereof and the upper end of beam 39 is adjustably connected between plates 38 by means of bolts 41. A chain 42 connects the plate 38 with the lift arm 33 to provide means for lifting the bedder units 13 to their raised or inoperative position.

A gauge wheel 43 provided with a square section vertical attaching standard 44 is adjustably received in a socket 45 attached to a forward extending arm 46 carried by plate 38. A set screw 47 (FIG. 2) is provided for retaining standard 44 in an adjusted position in socket 45. Arm 46 is adjustably secured to bedder beam 39 by means of bolts 48 and 41 (FIG. 1).

Figure 3:
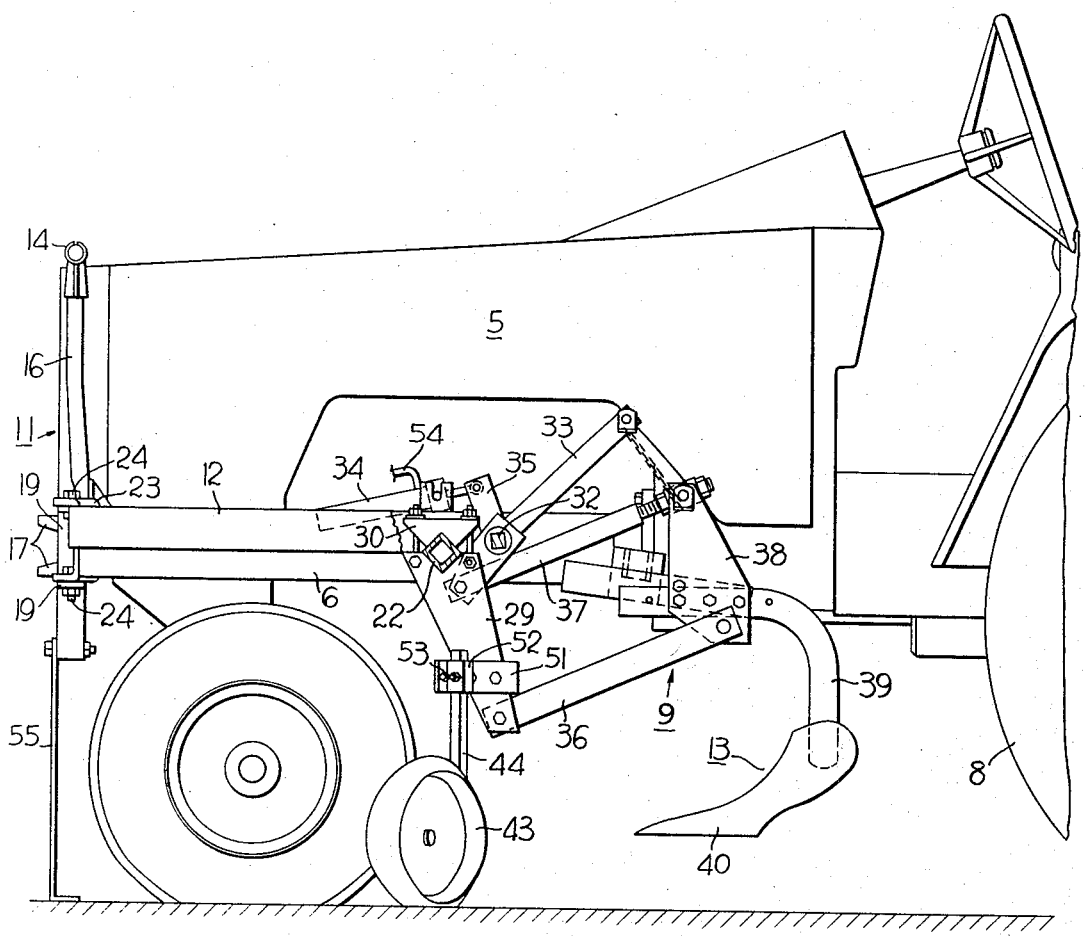
FIG. 3 is a view similar to FIG. 1 with the gauge wheel repositioned as in FIG. 2.
Figure 4:
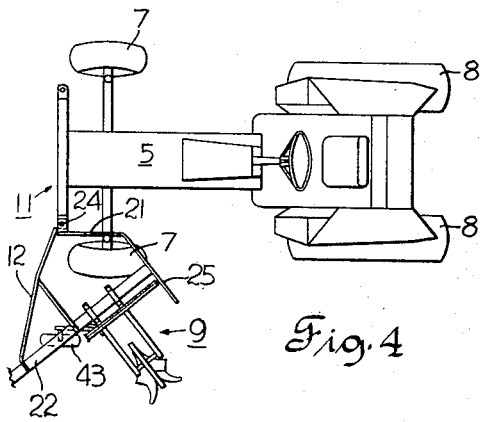
FIG. 4 is a reduced size plan view of the combination with the implement positioned relative to the tractor as when being initially attached or detached therefrom.

When detaching bedder 9 from the tractor, truss rods 28 are removed and the tractor hydraulic system is actuated to raise the bedder units 13 to an inoperative position clear of the ground as shown in FIG. 3. The gauge wheels 43 (FIG. 2) are removed from sockets 45 by unloosening set screw 47 and the standards 44 of the gauge wheels are then inserted in brackets 51 rigidly associated with the lower portion of bracket assembly 29. Bracket 51 is provided with a socket 52 for receiving standard 44. Suitable means such as set screws 53 are provided for clamping standard 44 in socket 52 in any desired vertical position relative to the ground. The outer ends of the side frames 12 are then jacked up by any suitable means and the repositioned gauge wheels are lowered as far as possible and rigidly secured in this position by tightening set screws 53. The bolts 26 are removed from the inner portion 25 of the side frame sections and the frames are swung away from the tractor into a position to permit the tractor to be backed up. Bedder units 13 are then lowered to the ground by actuation of the tractor hydraulic system releasing the fluid pressure in ram 34 and the ram hoses 54 are disconnected from the tractor. The tractor is then backed up still further pulling the center frame section rearwardly until the tool bars 22 of the side frame sections are positioned as shown in FIG. 4 with the longitudinal axis of the tractor. The front stand 55 (FIG. 3) which is pivotally connected to a depending portion of frame member 15 is then pivoted downward into contact with the ground and the bolts 18 uniting the center frame section 11 and the yokes 17 are removed to permit the tractor to be backed away from the implement which is now supported on the two repositioned gauge wheels 43 and the front stand 55. The reverse procedure is employed to attach the bedder to the tractor.

It should be noted that socket 52 (FIG. 2) is so mounted on bracket 51 that when standard 44 is inserted in socket 52 that the axis (x—x) of rotation of gauge wheel 43 will be substantially in a line which intersects the vertical axis of pivot bolts 24 thereby permitting the side frames of the bedder to be readily swung out from the sides of tractor about pivot bolts 24.

It should also be noted that with this invention auxiliary wheels are not required to support the main frames of the bedder unit when disconnected from the tractor and it should be also noted that no additional straps or links are required to prevent relative movement between the bedder units and main frame as is found in the prior art.

With this invention it is possible to reposition the gauge wheels in a foolproof manner. That is, sockets 52 are prepositioned to accurately align the axis of rotation of the gauge wheels in the desired direction and no adjustment and aligning of parts is required. This last advantage is very important because tools of this sort work in very unfavorable and dirty conditions and close tolerances can make adjustments under these conditions very difficult.

The embodiments of the invention for which an exclusive property or privilege is claimed are defined as follows:

A tractor mounted implementt including detachable frame means comprising a center section and outer sections swingably connected at one end to said center section and shiftable relative to the center section about generally vertical axes from a position substantially against the sides of the tractor to a position transversely outward therefrom, and ground working means connected with said outer frame sections and swingable generally vertically relative to the associated outer frame section between a ground working position and a position out of engagement with the ground, frame supporting means for said frame means for aiding in connecting and disconnecting said frame means to and from said tractor, comprising ground engaging support means connected with said center section to support the latter when disconnected from said tractor, a ground engaging gauge wheel having a short standard portion attached to said ground working means for movement therewith in normal operation, said ground engaging gauge wheel standard portion being detachable from said ground working means and being adapted for attachment to said outer frame for retaining said outer frame at the same height it was when supported from said tractor, and means carried by said outer frame for attaching said standard portion of gauge wheel to said outer frame with the axis of rotation of said wheel substantially intersecting the axis of swing of said outer frame and at right angles thereto.

References Cited
UNITED STATES PATENTS

| | | | |
|---|---|---|---|
| 2,635,521 | 4/1953 | Walz et al. | 172—273 X |
| 3,049,181 | 8/1962 | Oerman et al. | 172—274 X |
| 3,063,504 | 11/1962 | Oerman et al. | 172—274 X |

FOREIGN PATENTS 691,526  5/1953  Great Britain.

ABRAHAM G. STONE, *Primary Examiner.*

J. R. OAKS, *Assistant Examiner.*